United States Patent Office 3,536,945
Patented Oct. 27, 1970

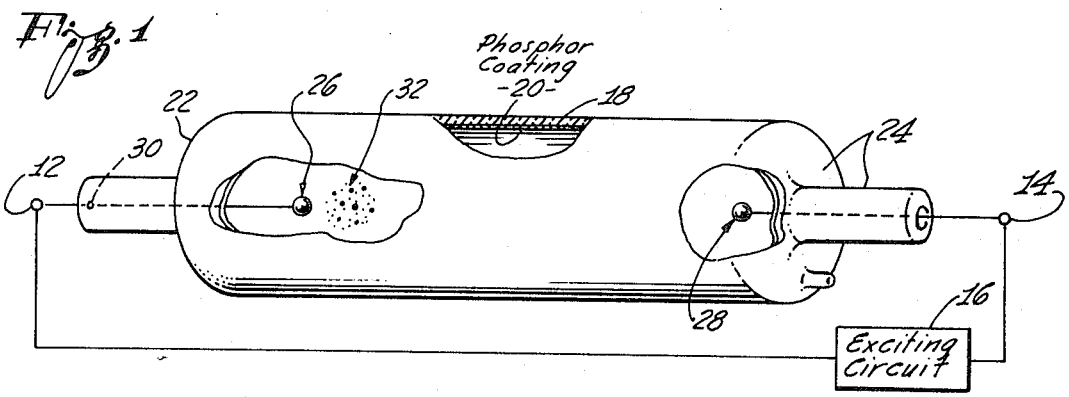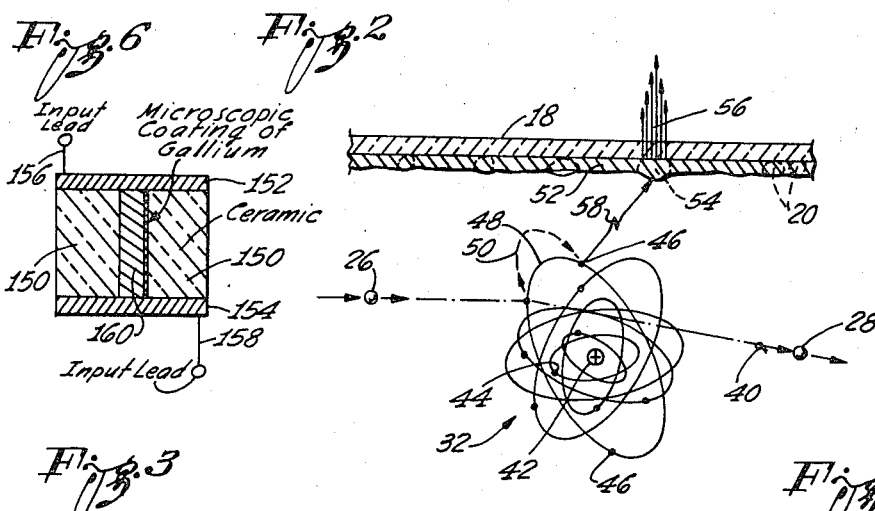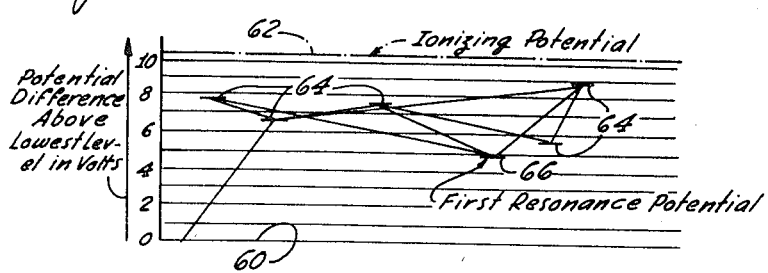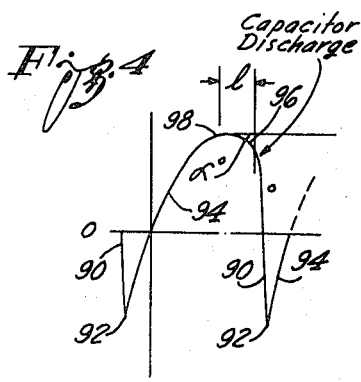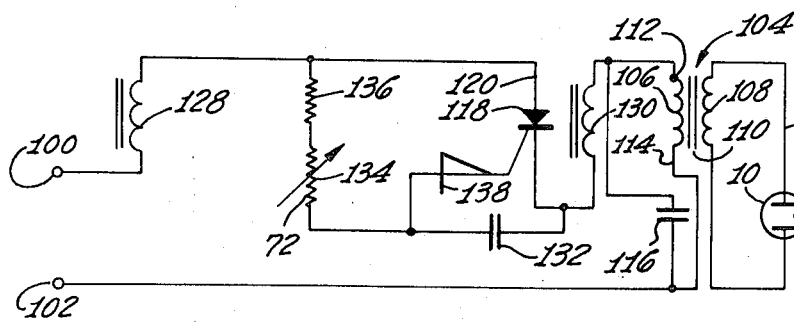

3,536,945
LUMINESCENT GAS TUBE INCLUDING A GAS PERMEATED PHOSPHOR COATING
Clifford D. Skirvin, Pomona, Calif., assignor to Microdot, Inc., South Pasadena, Calif., a corporation of California
Filed Feb. 14, 1966, Ser. No. 527,186
Int. Cl. H01j *61/16;* H01i *61/42*
U.S. Cl. 313—109          3 Claims

---

ABSTRACT OF THE DISCLOSURE

This invention relates to a luminescent gas tube which includes mixtures of gas to enhance luminescence of the tube. The mixture of gas includes a relatively small amount of a first gas to initiate ionization of the gases in the tube when electrons are emitted by the electrodes in the tube. The mixture of gas also includes a relatively large amount of a second gas. The second gas becomes ionized after the first gas becomes ionized, and the second gas has properties of enhancing the luminescence of the tube by suppling energy at particular frequencies. Phosphors may be provided in the tube to become energized upon the ionization of the gases in the tube to provide energy substantially only at the luminescent frequencies. Particular electrodes may also be provided to enhance the luminescence in the tube.

---

This invention relates to luminescent gas tubes and more particularly teaches new principles in the construction of electrodes, the choice of gaseous contents, and the pressures at which these contents are maintained in said luminescent tubes.

Most luminescent gas tubes at the present time are electric discharge lamps, usually in the form of a long glass tube coated internally with one or more fluorescent powders, commonly called phosphors. Electrodes are located at each end of such a tube and are usually made with iron, nickel, or tungsten, which may or may not be coated with special electron-emissive substance. The glass envelope of the tube may be straight or bent into a circle or any desired form. The tube is "pumped" (filled) at a certain pressure with a noble gas, or other similar substance, usually neon, argon, krypton, xenon, and vapors of mercury or sodium. In addition, there is inserted in the tube a small drop of mercury which vaporizes during operation of the tube.

In the operation of such a tube, an electrical discharge passing from the electrode at one end of the tube to the electrode at the other end through the noble gas and the mercury vapor generates ultraviolet radiation, which in turn excites the phosphor coating on the wall of the tube to emit visible light. The principles of enhancing lighting efficiency by optimizing both the frequency and the form of the input excitation signal are set forth in copending application, Ser. No. 437,127 filed Mar. 4, 1965, in the names of Clifford D. Skirvin, Jerome Zonis, and John Ketola and entitled "Frequency Enhancement of Light Emission."

The phosphors in general use in luminescent gas tubes have the characteristic that, when they are excited by ultraviolet radiation of about 253.7 millimicrons wavelength, they will emit visible light; that is to say—light in the spectrum of wavelengths between 380 millimicrons and 760 millimicrons. In the past, the above-mentioned mercury vapor has commonly performed the function of converting the energy in an electron discharge into electromagnetic radiation in the proper wavelength for exciting the tube phosphor.

The detailed mechanism of luminescent tube performance is that free electrons emitted from the more negative electrode in the tube collide with the valence electrons of the luminescent gas—in the prior art, mercury vapor. The collision of the discharge electrons with the valence electrons excites the latter by imparting to them part of the kinetic energy of the former, thus raising the valence electrons out of their normal energy level (usually called "valence band") to a level of higher energy (called the "conduction band"). When such an excited electron returns to its equilibrium valence band, part of the excess energy discarded as surplus once it returns to its low energy state is emitted as electromagnetic radiation.

According to the presently accepted quantum theory, this radiation is emitted in discreet units called "quanta." The magnitude of each such quantum is $h\nu$, where $h$ is Planck's constant ($6.62517 \times 10^{-27}$ erg seconds) and $\nu$ is the frequency in cycles per second of the electromagnetic radiation. Thus the frequency or wavelength of the radiation depends on the amount of energy in the quantum, and the amount of energy in the quantum depends upon the energy level drops characteristic of the specific type of atom or molecule in which the valence electron is changing from excited to valence energy levels. The reason that mercury vapor has been almost universally used as the luminescent gas in fluorescent tubes is that it has a characteristic excited level called "the first resonance potential" that is just far enough above the valence level that, when an electron drops from the first resonance potential to the valence level, ultraviolet radiation is emitted. Since this ultraviolet radiation is substantially the wavelength that the phosphor crystals coated on the gas tube envelope will convert into visible light, mercury vapor has been a useful "converter" in the multistage process of converting electron flow energy into visible light energy.

Some common materials used as the phosphors of fluorescent lamps are magnesium tungstate, calcium halophosphate, calcium silicate, and calcium-strontium phosphate. These materials require the presence of activator atoms in their crystal lattice in order to convert photons of light from the luminescent gas into photons of visible light for room lighting. Common activators are antimony, a mixture of antimony and manganese, lead, and tin. It is very important that the phosphors be free of all impurities; for their efficiency of conversion falls off very fast as contaminants begin to appear, even in only hundredths of percent concentration.

The predominant measure of efficiency of performance of luminescent gas tubes is a parameter called "efficacy," which is the ratio of luminous flux output (lumens) to total power input (watts). The highest efficacy theoretically attainable is 680 lumens per watt, which is the output that would be obtained if all the input power were converted to green light at 555 millimicrons wavelength, the light wavelength to which the human eye is most sensitive. The maximum theoretical efficacy of any light source producing white light with its entire output distributed uniformly with respect to wavelength within the visible region is only 200 lumens per watt. Thus it can be seen that by concentrating the output wavelength of any light source near the 555 millimicron point, efficacy can be improved beyond that possible with white light. The efficacy of present-day luminescent gas tubes is about 55 to 65 lumens per watt. Sodium vapor lamps have been known to reach efficacies of 90 lumens per watt, but the light emitted thereby is limited to a very narrow double-line spectrum in the yellow region (around 589 millimicrons), so that aside from highway lighting the sodium vapor lamp is not particularly useful.

One of the great problems and sources of expense and weight in present-day fluorescent lamps is the necessity for a starting circuit. Like most gas tubes, a fluorescent lamp has a negative resistance characteristic; that is to say, the resistance across the lamp decreases once current begins to flow through the gas in the tube. Moreover, in order to initiate current flow, a much higher voltage must be imposed across the tube than can be used once the tube is operating normally. Thus present luminescent gas tubes must be started by an especially high voltage generated by capacitor storage or some other transient method. Once they have started, they have to operate with some sort of current control, such as a ballast, in series with one tube electrode and one terminal of the tube power supply. Among the complicated starting methods presently used with fluorescent lamps is the preheat type of system which requires an automatic starting switch, the instant starting system which requires very high voltages, or cathode heating systems where one or more electrodes of the tube are continuously heated so that the tube may start up without requiring a high voltage or a starting swich.

In the course of starting a luminescent tube, a high voltage ranging up to 1000 volts may be used to force electron emission from the electrodes into the tube. This type of electron flow will be maintained until the gases in the tube are ionized to sustain the flow with lower voltage. It is the violence of such starting methods on the electrodes and end fittings of the tubes that limits the service life of luminescent gas tubes. In particular, the oxide coating on gas tube electrodes "sputters" during starting, causing the characteristic blackening at the end of the tube and reducing the amount of electron-emissive material on the electrode for performing the function of providing electron flow in the tube. Not only does sputter cut down on the service life of tubes; it is also the major factor in the lumen maintenance ability of the tube. The term "lumen maintenance" refers to the capability of the tube of maintaining the same output of lumens per watt input throughout its life that it had at some reference time after its service began. Due to the rapid decline in lumen maintenance of the tube in its first hours of service, the reference point is usually taken as the hundred-hour point. This initial loss has been found to be about 18% for one type of luminescent tube, and all tubes are deteriorated enough by repeated starts that any means to reduce the violence or impact of starting currents will be of great help.

Another disadvantage in present fluorescent lamp systems is the narrow ambient temperature range that the lamp can operate in. A mercury vapor fluorescent lamp reaches its maximum efficacy at 77° F. Above that point the efficacy falls off about 10% for each 20° F. increase, due to the increasing ionization of the mercury vapor molecules due to heat, thus precluding ionization due to electron bombardment. As ambient temperature declines from 77° F., the fall-off in efficiency is even more extreme, for then the mercury droplets present in the tube will not vaporize at all.

Other disadvantages associated with present-day mercury vapor fluorescent lamps include the high end losses and inefficiency of present-day electrodes. Moreover, there is the RFI problem created by the ionization of mercury and its resulting electromagnetic radiation and RFI power line coupling, both of which are capable of creating buzz in radio reception sets in the vicinity of the fluorescent lamp. Although the radiation of RFI can be suppressed somewhat by the use of heavy shielding, the conduction of RFI noise signals back from the electrodes of the fluorescent tube can be prevented only by the use of noise decoupling filters, either in connection with the tube or in connection with the radio sets nearby.

The general purpose of the instant invention is to provide an improved luminescent gas tube that minimizes the effect of the disadvantages discussed above. The major area of improvement is in regard to the efficacy of the gas tube in terms of lumens output of light per each watt of electrical input excitation signal consumed. Another purpose of the invention is to provide a luminescent gas tube that has improved lumen maintenance; that is to say, its light output does not decrease with age or extended service life. Another important purpose to be achieved by the gas tube disclosed herein is the provision of easier starting requirements than in prior tubes so that less heavy and expensive startup circuitry is required. Other objects include the capability of operating in a wider range of ambient temperatures and extension of electrode life and durability.

In the achievement of the above and other objects and as a feature of the instant invention, applicant provides as a first principle that the glass envelope of the luminescent gas tube be "pumped" (filled to a certain pressure) with gases selected from the following: helium, argon, neon, krypton, xenon, and other noble gases, and nitrogen, hydrogen, ammonia, natural gas, radon and the like. As another feature of the invention these gases are pumped to certain pressures depending upon the gas the ambient temperature, the tube diameter, and the frequency of input electrical excitation signal expected to be applied.

Another feature of the invention is the application of combinations of the above-named gases that are so selected that a resonant frequency of one of said gases is a harmonic or subharmonic of a resonant frequency of one of the other of said gases at a certain pressure relationship between the gases. In such situation it has been found that at the resonant frequency of the gas combination very high light output and low power consumption in the tube will result. Applicant has discovered that this harmonic-subharmonic combination principle is dependent upon the gases selected and the relative partial pressures thereof, but not on the tube diameter, tube length, or total pressure in the luminescent tube. For example, a combination of one mm. Hg of neon and 16 mm. Hg of krypton is a gas tube has been found to have a resonant frequency of 23 kc. In actual trials, such a neon-kryptron tube operated at 23 kc. had an increase in luminous efficacy of 400% over present-day commercially-available tubes. If the input excitation signal frequency varied between 17 kc. and 27 kc., the improvement in efficacy would still be 200% or better. Another great advantage of the principles of the instant invention is that such a tube requires no ballast and furthermore does not need a high initial transient voltage to start conduction. Another principle of the invention relates to the variety of light coloration that may be obtained from different combinations, pressures and excitations of luminescent gas tubes.

Other principles of the invention relate to the use of added gases in small amounts in order to obtain long glow periods of the phosphor used in most luminescent tubes and the variation of electrode construction to obtain improved performance and low cost of manufacture.

Other objects and features of the instant invention and a better understanding thereof may be had by referring to the following description and claims taken in conjunction with the accompanying drawings in which:

FIG. 1 is a side elevation partially in cutaway of a luminescent gas tube according to the principles of the instant invention;

FIG. 2 is a schematic diagram illustrative of the process of converting electrical energy to visible light, as it takes place in luminescent gas tubes;

FIG. 3 is an energy level graph showing the quantum theory aspects of the process of FIG. 2;

FIG. 4 is a graphical illustration of a preferred waveform for the input electrical excitation signal used across the electrodes of the tube of FIG. 1;

FIG. 5 is a schematic diagram of a preferred electrical circuit for applying the waveform of FIG. 4 across the electrodes of the tube of FIG. 1; and FIG. 6 is an electrode arrangement according to the principles of the instant invention.

Referring to FIG. 1, a preferred embodiment of a luminescent gas tube according to the principles of the instant invention is a tube 10 having a first electrical input terminal 12 and a second electrical input terminal 14. Input electrical excitation signals are applied across the terminals 12, 14 by a circuit 16, which will be discussed more specifically below. The tube 10 has an outer envelope 18 made of glass or the like. The inside wall of the envelope 18 is coated with a phosphor 20.

The glass envelope 18 of the tube 10 has two ends 22 and 24. Associated with each end 22 and 24 is an electrode 26, 28, respectively. According to one principle of the instant invention, an improved electrode is provided by constructing the electron-emission portion thereof in the shape of a ball, with the specific composition to be discussed below.

Each electrode 26, 28 is electrically connected to its respective terminal 12, 14 by a lead 29 which passes through the respective end wall 22 or 24 at a point 30 which must be hermetically sealed in order that the pressures and gas compositions of the luminescent gases inside the envelope 18 will not be able to degenerate due to escape into the outside atmosphere or contamination therefrom.

The envelope 18 is pumped with a mixture of gas molecules (represented at 32). In a tube pumped according to the principles of the instant invention the molecules 32 would preferably include molecules of either one or more of the following gases: neon, argon, helium, hydrogen, nitrogen, ammonia, krypton, xenon, radon, and any of the coal gases, natural gases, and petroleum extracts. It should be noted that hydrogen and the coal, natural, and petroleum gases would be explosive if traces of oxygen got into the tube or were present therein in the form of impurities when the tube was sealed; thus, these gases might not be as practicable for use in the tube 10 as some of the others named, but their performance is in certain respects of the sort desired.

One of the important considerations necessary to be considered in arriving at the principles of the instant invention is the ionization voltage of each of the above-named gases. This ionization voltage is the electrical potential necessary to give a valence electron of one of the gas molecules 32 sufficient added energy to become free of the molecule and thus available for conduction of electrical current between the electrodes 26 and 28. The total voltage necessary to ionize any gas varies with the distance over which it is applied, so that ionization voltage is best expressed as the number of volts per centimeter of gas across which the voltage is to be applied. The inoization voltages of the preferred gases for use in the tube 10 are: neon—6.3 v./cm., argon—19 v./cm, helium—23 v./cm, hydrogen—26 v./cm, kryptron—56 v./cm, xenon—63 v./cm, and nitrogen—64 v./cm. From the above figures it can be seen that in luminescent tubes of several feet in length, the number of volts required to ionize the higher gases, such as krypton and xenon, would be prohibitively high. One of the principles of the instant invention is a method for producing ionization of such high voltage gases in luminescent tubes without requiring the imposition of the full ionization voltage for that gas between the electrodes 26, 28.

It should be noted that the above-named gases are largely inert so that even when extremely high voltages are applied across the electrodes of luminescent tubes in which they are confined, the gases do not burn. They simply ionize and release their valence electrons to support conduction between the gas tube electrodes. However, such an ionization process is extremely hot and destructive to the tube components, especially the electrodes used in the prior art. Also, the high heat produced requires that high power be applied to the tube. In prior art luminescent tube systems, without the application of this high power, ionization and tube lighting did not occur.

It should also be noted that in prior art luminescent gas tube systems, once ionization was achieved the resistance of the tube dropped very quickly from the very high resistance presented before conduction electrons were available in the gas mixture to a far lower level. If it were not for the use of auxiliary "ballast" circuitry as described above, the tube would then burn up due to the immense amount of power it was permitting to pass through.

Referring to FIG. 2, the performance of the tube 10 in the process of fluorescent lighting is as follows: an input electrical excitation signal is applied by the circuit 16 across the electrodes 12, 14. This signal causes a voltage difference to occur between the electrodes 26 and 28, so that there is a tendency for electrons to pass therebetween through the gas 32.

FIG. 2 is a schematic diagram showing what takes place as the electrons passing between the electrodes 26 and 28 interact with the molecules 32. The electron emitted from one of the electrodes 26, 28 will hereinafter be referred to as a conduction electron and will be denoted by the numeral 40. Conduction electrons 40 may proceed from either electrode 26 or 28, depending on which is at the more negative potential under the influence of the signal line from 16 or, in other words, is acting as the momentary of the instantaneous cathode of the tube 10. Since it is common to apply AC signals of 60 c.p.s. or greater across the terminals 12, 14, the cathode-anode relationship of the electrodes 26, 28 would reverse every half cycle.

An electron 40 proceeding from the cathode (here shown as the electrode 26) of the tube 10 would eventually collide with one of the molecules 32. Each such molecule has a nucleus 42, inner electrons 44, and outer or valence electrons 46. The difference between the inner electrons 44 and the valence electrons 46 is that the inner electrons cannot be excited out of their orbits, whereas the valence electrons 46 can be either excited to wider orbits or completely separated (ionized) from the molecule 32. The orbit of the valence electrons 46 of the molecule 32 is represented at 48.

The effect of collision between a conduction electron 40 and a molecule 32 is a deflection of the electron 40 and a corresponding deflection of one of the valence electrons 46. The electrons 40 and 46 do not come into actual physical contact, but they do reach sufficient proximity to have gravitational and electromotive effect on one another. Thus the conduction electron 40 excites the valence electron 46 by imparting to it part of the kinetic energy of the conduction electron 40. This results in raising the valence electron 46 from its normal energy level represented by the equilibrium velocity of the orbit 48 to a higher energy level represented by the velocity and momentum of the orbital path 50. As the shortness of the path 50 implies, the valence electron 46 spends only a short time in its excited state.

After collision the conduction electron 40 loses speed and changes direction, but it does continue along the tube 10 to excite or ionize one or more additional atoms 32 before losing its energy step by step and thus completing its travel. The end of its free conduction path will usually be at the wall 18 of the tube 10, where it recombines with an ionized atom. A portion of the electron current, however, is collected by the anode, in FIG. 2 the electrode 28, for the electrical field across the tube does maintain a conduction electron density throughout the entire length.

As stated above, it is only a short time before the excited valence electron 46 returns from its excited orbit 50 to its normal orbit 48. This return may be made either in a single transition or by a series of discreet steps from one excited level to a lower excited level. Each of the discreet steps is distinguished by the emission of one photon or quantum of electromagnetic radiation. Referring to FIG. 3, the chart therein shows the different excited levels available to a valence electron in a typical luminescent gas.

A zero-level 60 at the bottom of the energy level graph of FIG. 3 (called the "valence level") represents the kinetic energy that an electron 46 would have when it is in its valence orbit 48. The dotted line 62 at the top of FIG. 3 (called the "ionization potential") represents the number of electron volts necessary to completely free a valence electron 46 from an atom 32. For the mercury vapor used in present tubes, this ionizing potential is 10.38 volts per centimeter of electrical field. The ionization potential for other gases found in luminescent tubes is as specified above.

FIG. 3 shows a number of discreet excited levels 64 between the valence level 60 (0 volts) and the ionizing potential 62. These levels 64 exist for all the luminescent tube gases mentioned above. Moreover, applicant has discovered that different levels 64 exist for mixtures of these gases. The important level in any gas or mixture, however, is that shown at 66. It is called the first resonance potential of the gas. Whenever an electron 46 drops from one level 64 or 66 to a lower level 60, 64, or 66, the amount of energy (quantum) represented by the difference between the necessary kinetic energy of the electron 46 at the higher level 64 or 66 and the kinetic energy of the electron 46 at said lower level 60, 64 or 66 that it is dropping to is emitted in the form of electromagnetic radiation. Since the potential levels 60, 64, and 66 are fixed quantities for each type of atom or molecule 32, the electromagnetic radiation emitted by these changes in state is characteristic for each such substance. Upon any single change from level to level, one photon of electromagnetic radiation is emitted. The wavelength of this radiation will be determined by Planck's formula: $E_h - E_1 = h\nu$, where $E_h$ equals the higher potential level which the electron left; $E_1$ equals the lower potential level which the electron fell into; $h$ equals Planck's constant; and $\nu$ equals the frequency of the emitted radiation.

Since all of the levels 64 and 66 are fixed for any substance, the $\nu$ for electrons passing therebetween will also be fixed, giving that substance characteristic frequencies or lines of radiation. The special importance of the first resonance potential 66 is that the frequency of radiation emitted by an electron 46 traveling from the level 66 down to the valence level 60 is within the ultraviolet range which will stimulate materials in the phosphor coating 20 to emit photons in the visible light range.

The material 20 is composed of phosphor crystals 52 including a very few "activator crystals" 54 in which an atom or a molecule of activator substance has been inserted in the crystal lattice. Common activators are antimony, a mixture of antimony and manganese, lead, and tin. The effect of the activator crystals is to provide photon emission potentiality to the phosphor, because the disturbed crystals 54 have "traps" similar to the levels 64, 66 shown in FIG. 3. When valence electrons in the activator crystals 54 are excited above their valence level (analogous to that shown at 60 in FIG. 3), rather than going all the way to the conduction state (analogous to that shown at 62 in FIG. 3), they rise to various traps 64, 66 and then fall back to the valence level 60. In doing so they emit electromagnetic radiation 56 in the visible light range. Electrons in the crystals 54 are stimulated above their valence level 60 to their traps 64 and 66 by the absorption of the crystals 54 of ultraviolet radiation 58 from the molecules 32 in the luminescent tube 10.

Thus the luminescent lamp process represented in FIG. 2 has the following steps:

(1) An electrical field between the electrodes 26 and 28 causes the emission and travel of electrons 40.

(2) The electrons 40 collide with the valence electrons 46 of the gas molecules 32, causing the valence electrons 46 to leave their normal orbits 48 for an excited orbit 50.

(3) The valence electrons 46 return from their excited orbit 50 toward their valence orbit 48 through a number of discreet steps as shown in FIG. 3. The drop from each discreet step 64 or 66 to a lower discreet step 60, 64 or 66 results in the emission of surplus energy in the form of electromagnetic radiation of a frequency determined by Planck's formula.

(4) Electromagnetic energy emitted by the electron 46 is radiated as shown at 58 to the phosphor crystals 52 and 54.

(5) Activator crystals 54 absorb certain wavelengths of electromagnetic energy.

(6) The energy absorbed by an activator crystal 54 excites a valence electron therein into an excited orbit, and in returning to its valence orbit the valence electron emits visible light 56.

It should be noted that by proper mixing and pressurization of the above-mentioned gases, photons in the visible range may be produced by the gas molecules 32, so that a pure gas tube 10 may be used for lighting, without any intervening phosphor crystals 52, 54. In such case, steps 4–6 above are eliminated, and thus tube manufacture is made simpler and less expensive.

One principle of the instant invention for the improvement of the performance of the luminescent lighting operation as described above comprises the mixture of two or more of the gases named above in such quantities and pressures that the resonant frequency at one of the gases is a subharmonic or a harmonic of the resonant frequency of the other. The phenomenon of resonance in luminescent gas tubes is described more thoroughly in U.S. application Ser. No. 437,127 entitled "Frequency Controlled Enhancement of Light Emission" filed on March 4, 1965, by Clifford D. Skirvin, Jerome Zonis, and John H. Ketola. To summarize the principles of that application, the output of a luminescent gas tube passes through a maximum efficacy at certain harmonic frequencies which vary according to the substance being used as a luminescent gas and the pressure thereof.

All of the gases named above can be operated at such a resonant frequency, wherein they are in a resonant condition in which they produce maximum light output for minimum applied electrical power. The advantage of using a mixture of gases wherein the relative quantities and pressures of the two are such that at a certain excitation signal frequency both of the gases resonate is that in such condition both gases will produce light. If one of the gases is of a very high power factor while the other of the gases is at a low power factor, light will be obtained from both at substantially the power factor of the lower. Thus the efficacy of the mixture is vastly increased.

Of the gases named above, those having the heavier molecules tend to produce the higher light output. However, they also have the higher power factors. Thus, according to the principles of the instant invention the mixture of a heavy molecule—high light output gas with a light molecule—low output gas in such quantity and pressure relationship that the gases resonate together will result in achieving the high light output of the heavier gas while expending power only at the power level consumed by the lighter gas. For example, krypton gas has a very high light output, while neon gas has a low power factor. By the mixture of very little neon with krypton in a luminescent gas tube, the tube can be made to ignite or ionize at the low power factor and ionization voltage of the neon, yet once conduction has begun the krypton gas will produce light just as readily as if the krypton itself had been ionized originally. However, to ionize the krypton gas would have required about ten times the starting voltage that the neon required.

As a specific example of the practice of the neon-krypton mixture principle, a luminescent gas tube of the design shown in FIG. 1 having a diameter of 12 millimeters and any desired length would require 1 mm. Hg of neon and 16 mm. Hg of krypton. If such a luminescent gas tube has an input excitation signal applied to its electrodes 26, 28 at 23 kc., it will produce about four times as much light per watt of power applied as can be achieved by using presently-known lighting principles. In fact, any excitation frequency from 17 kc. to 27 kc. will give double the light output heretofore achievable, and the tube will perform well anywhere above 10 kc.

Such a tube as described above does not require a ballast circuit associated with its power supply. As a result it responds as follows when initially turned on. Since no ballast is present, there is a high initial transient voltage which ignites the krypton. This transient voltage cannot ignite the neon because the neon is present in such small quantities. This initial ignition of krypton produces only a soft glow discharge light from the krypton, but the krypton succeeds in igniting the neon. Once the neon is ignited, it supports conduction of electrons between the electrodes 26, 28 so that the process illustrated in connection with FIG. 2 can occur. Since free electrons are not bound to collide only with the neon atoms, both neon and krypton atoms have their valence electrons 46 dislodged by conduction electrons 40 passing through the tube. It should be noted that this dislodging is achieved only by applying sufficient ionization voltage to make the neon produce free electrons (6.3 v./cm.). Thus, the need for the very high ionization voltage for krypton is avoided since the neon ignited substantially all of the krypton.

It has been found that the above-described beneficial cooperation of neon and krypton occurs only at the harmonic-subharmonic frequency mentioned above, i.e., 23 kilocycles or thereabouts. Once a neon-krypton tube is operating, however, it acts as a very good voltage regulator and current indicator. Furthermore, it does not produce the wasteful heat found in present luminescent tubes. The absence of this heat not only means that power is being consumed, but also eliminates the mounting and shielding problems present with tubes now in use. For example, the neon-krypton tube specified above, once in operation, drew only 100 milliamps of current at very low voltage.

It should be noted that the movement of the molecules 32 in response to collision with the electrons 40 can occur only at a finite speed. Yet, the resonant condition discussed above, which is in effect parallel resonance, is the result of the molecules moving in parallel orientation. Thus, frequencies of the order of 23 kilocycles as specified above have a very important reason for being. Since collision and movement of the molecules 32 is a function of the peaks of the input excitation signal, the more peaks that occur the greater will be the activity of the molecules 32. On the other hand, when the frequency of the peaks exceeds the resolution ability of the gases present in the tube 10, the resonant effect can no longer be achieved because the input excitation signal begins to look like DC. Thus, the fall-off of efficacy of luminescent gas tubes occurs as the frequency is increased beyond the resonance frequency.

One of the reasons for being able to use the combination of two different gases in a tube to increase the efficiency in the operation of the tube may result from the use of relatively high frequencies such as 23 kilocycles per second. Since these frequencies are higher than those previously used to excite fluorescent tubes, the experts in the prior art may not have appreciated that two different gases could be combined to make the luminescence of a tube efficient, especially where one of the gases has a relatively low ionization voltage and is relatively low in quantity in the tube and the other gas has a relatively high ionization voltage and is relatively high in quantity in the tube.

As a result of the above-discussed need to find a resonant frequency and also as a result of the desire to let the tube act as its own ballast device, it is a principle of the instant invention to vary the gas pressure rather than using the same standard pressure (usually 15 mm. Hg) as is done in the prior art. For example, as the length of tube used is increased, the pressure of the gas in the tube should be increased to make the characteristics of electron travel the same for all lengths of tube. Then, when such a tube is used with a power supply, the tube will act as a ballast and accommodate to varying levels of power factor to resonate at certain frequencies.

Another principle of the instant invention is the mixture of the above-named gases to provide photon emission (at 58 of FIG. 2) that will be most compatible with the phosphor activator 54 in use in the particular luminescent gas tube. In other words, the proper mixture of the gases at 32 will result in the production of photons in a wavelength most readily convertible by the activator 54, and will dissipate a minimum of energy by producing photons not within the conversion range of the phosphor 52. For example, the neon-krypton arrangement disclosed above burns in the ultraviolet range which is best for most phosphors, although neither neon nor krypton used separately produces ultraviolet radiation. Thus the neon-krypton or other mixtures in tubes according to the same principle as provided by the instant invention do not require the presence of mercury vapor in the tube for the conversion of electrical energy into photons in the conversion range of the phosphor.

Moreover, luminescent tubes can be made according to the principles of the instant invention in such manner that no phosphor at all is required, simply by ionizing the proper gases or mixtures of gases from the elements named above to cause visible light to be emitted directly therefrom. For example, helium will give cream-white light directly without intervention of the phosphor. Argon will produce blue, and neon will produce red. Both krypton and xenon produce a blue-white light, which tends toward the blue if the power applied is decreased somewhat to a "starved" level. Nitrogen gas in a phosphorless tube of the sort shown in FIG. 1 will produce a reddish-white or yellowish-white light, depending upon the excitation, while hydrogen gas will produce almost pure white. The infinite number of possibilities resulting from combination of the above-named gases are too numerous to discuss herein, but the result of such combinations, though presently unknown, are within the principles of the instant invention.

Another feature of this invention is the provision of a luminescent gas tube that has a glow period after its excitation signal has been removed. This glow can be achieved by manufacturing the tube in such manner that after all the impurities have been burned out of the glass envelope 18 the tube is filled with helium gas and thereafter lighted with sufficient intensity to keep the inside of the tube to the temperature range of 60° C. to 100° C. In this temperature range the helium gas in the tube will be absorbed into the phosphor, much as water is absorbed into a sponge. When the helium gas contents of the tube are then evacuated, some helium will remain in the phosphor. The combination of gases to be used in the tube are then inserted into the tube at the proper pressure for each gas, and the tube is sealed. For example, helium at 1 mm. of pressure and krypton at 16 mm. of pressure may be inserted into the tube.

Following this helium treatment, when other tube gases such as the neon-krypton combination or many other possible combinations are inserted in the tube, the tube can be made to glow up to 15 minutes in a dark room after the excitation signal applied across the electrodes 26, 28 has been removed. The reason for this is that the helium absorbed by the phosphor acts as a catalyst whereby electrons excited by the input excitation signal requires as much as fifteen minutes to get all the way back to their valence band after having been moved out to the excited state.

It will be appreciated that the combination of neon and krypton in a tube as described above is only one of a large number of combinations which may be used. As another example, a combination of neon at 2 millimeters (mm.) of pressure and argon at 4 mm. of pressure may be used in a tube having a diameter of 12 millimeters. As a further example, a combination of krypton at 2 mm. of pressure and xenon at 5 mm. of pressure in a tube having a diameter of approximately 12 mm. may also be used.

It will be seen in all of the above examples that a relatively small amount of gas with a relatively low ionization voltage is mixed in a tube with a relatively large amount of gas having a relatively large ionization voltage. This may be seen from the following table listing the different gases and their ionization voltages.

| Gas: | Ionization voltage/centimeter |
|---|---|
| Neon | 6.3 |
| Argon | 19 |
| Helium | 23 |
| Hydrogen | 26 |
| Krypton | 56 |
| Xenon | 63 |
| Nitrogen | 64 |
| Ammonia | 17 |

It will be appreciated that helium, argon, neon, krypton, and xenon are noble gases and that nitrogen, hydrogen and ammonia in the above table are not noble gases. Although all of the examples above relate to noble gases, it will be appreciated that the combinations of gases in the tube can include gases other than noble gases. It will also be appreciated that other gases than those listed in the table above can also be used.

As stated heretofore the disadvantages associated with present-day mercury vapor fluorescent lamps include the RFI problem created by the ionization of mercury and its resulting electromagnetic radiation and RFI power line coupling, both of which are capable of creating buzz in radio reception sets in the vicinity of the fluorescent lamp. Although the radiation of RFI can be suppressed somewhat by the use of heavy shielding, the conduction of RFI noise signals back from the electrodes of the fluorescent tube can be prevented only by the use of noise decoupling filters, either in connection with the tube or in connection with the radio sets nearby. The above-described mercury-less tubes of the instant invention avoid these problems.

The general accomplishment of the instant invention therefore is to provide an improved luminescent gas tube 10 that minimizes the effect of the disadvantages discussed above. The major area of improvement is in regard to the efficacy of the gas tube 10 in terms of lumens output of light per each watt of electrical input excitation signal consumed. Another accomplishment of the invention is to provide a luminescent gas tube that has improved lumen maintenance; that is to say, its light output does not decrease with age or extended service life. This is achieved by the above-described tubes due to the elimination of high heat, high starting power, and other such extreme conditions. Another important achievement of the gas tube disclosed herein is the provision of easier starting requirements than in prior tubes so that the less heavy and expensive startup circuitry is required. Also, there is the capability of operating in a wider range of ambient temperatures and the extension of electrode life and durability.

Specifically, applicant provides as a first principle that the glass envelope of the luminescent gas tube be "pumped" (filled to a certain pressure) with gases selected from the following: helium, argon, neon, krypton, xenon, and other noble gases, and nitrogen, hydrogen, ammonia, natural gas, radon, and the like. As another feature of the invention these gases are pumped to certain pressures depending upon the gas, the ambient temperature, the tube diameter, and the frequency of input electrical excitation signal expected to be applied.

Another feature of the invention is the application of combinations of the above-named gases that are so selected that a resonant frequency of one of said gases is a harmonic or subharmonic of a resonant frequency of one or the other of said gases at a certain pressure relationship between the gases. In such situation it has been found that at the resonant frequency of the gas combination very high light output and low power consumption in the tube will result. As stated above, this harmonic-subharmonic combination principle is dependent upon the gases selected and the relative partial pressures thereof, but not on the tube diameter, tube length, or total pressure in the luminescent tube. Another great advantage of the principles of the instant invention is that such a tube requires no ballast and furthermore does not need a high initial transient voltage to start conduction. Another principle of the invention relates to the variety of light coloration that may be obtained from different combinations, pressures and excitations of luminescent gas tubes.

The features of the invention also extend to the use of helium or the like in small amounts in order to obtain long glow periods of the phosphor used in most luminescent tubes.

The operation of the tube constituting this invention as a ballast and on a resonant basis may also be seen from the fact that the current through the tube remains substantially constant as the pressure of the gas in the tube varies. For example, when the tube has a diameter of 5 mm. and a length of 12 inches, and the gas in the tube has a pressure of approximately 6 mm. and constitutes a combination of helium and krypton, the current through the tube may be approximately 13.5 milliamperes and the tube may have a flash rate of 36/minute and a dwell time of approximately 40 milliseconds. At 7 mm. of pressure in the tube, the tube may have a flash rate of 44/minute and a dwell time of approximately 35 milliseconds, and the current through the tube may be still approximately 13.5 milliamperes. When the pressure of the gas in the tube is increased to 8 mm., the current through the tube increases only to approximately 14 milliamperes, and the tube may have a flash rate of approximately 48/minute and the tube may have a dwell time of approximately 30 milliseconds. At a gas pressure of 9 mm. in the tube, the current through the tube will still be only approximately 14 milliamperes, and the flash rate of the tube is 50/minute and the dwell time is 25 milliseconds. The relatively low current through the tube and the substantially constant value of this current with different gas pressures indicate that the tube is in a resonant condition and that the different gases in the tube respond to this resonant condition. As will be appreciated, the flash rate of the tube indicates the relative number of times per minute that the gas in the tube is ionized and de-ionized. The dwell time indicates the time that the gas in the tube remains de-ionized after each cycle of operation and before the initiation of the next cycle of gas ionization.

Referring to FIG. 4, a preferred waveform for the input electrical excitation signal generated at 16 and applied across the electrode leads 12, 14 is graphed herein. The abscissa of the graph is time and the ordinate of the graph is voltage, although current and power supplied across the terminals 12, 14 would be roughly the same. The purpose of the applied waveform of FIG. 6 is to supply energy to the luminescent gas molecules 32 in the tube 10 whereby valence electrons 46 of the individual atoms 32 of the gas are excited out of their normal orbits 48 into some excited orbit 50. When the electron 46 later returns to its normal orbit 48, its excess energy is emitted as a quantum of radiation, as discussed above. Accordingly, each cycle of input excitation signal begins with a negative-going excursion 90 which reaches a low point 92. Thereafter, the wave rises at 94 and then decays slowly at 96 before beginning another negative excursion at 90. A high point is reached at 98, fairly near the beginning of the positive-going excursion 94.

The high initial level 98 forces a maximum of energy across the gas 32 at the beginning of each cycle; then the decay 98 imposes an infinitude of harmonics (ranging up to hundreds of megacycles in frequency) upon the gas tube electrodes 26, 28. At certain fundamental frequencies of the waveform of FIG. 6 determined by tube 10 diameter, contents, pressure and other characteristics, one or more of the higher harmonics in the applied waveform of FIG. 6 will traverse the tube 10 in such manner that the gases 32 will offer greatly reduced attenuation to said harmonics. Moreover, as is usual with luminescent gases, the gas 32 exhibits various spectral characteristics and increased efficacy in certain very small wave bands, so that variation of the fundamental frequency by changing the length $l$ or the angle $\alpha$ of the decaying slope 96 of the waveform of FIG. 6 will vary the applied harmonics until one appears that brightens the gas tube 10 considerably without expending any more applied power from 16. A more extensive discussion of these input electrical excitation signal principles may be found in the above-cited U.S. application Ser. No. 437,127.

Referring to FIG. 5, the oscillator circuit shown schematically therein is a preferred power supply circuit for use in the position 16 of FIG. 1. It converts power from a line or other source which is applied across its power supply input terminals 100 and 102. It has an output transformer 104 having a primary 106 and a secondary 108. The ends of the secondary 108 are coupled to the terminals 12, 14 of the tube 10 of FIG. 1. The transformer 104 has a core 110 which, for the purposes of RFI suppression—at least as far as noise appearing on the terminals 12, 14 is concerned—should be made of a very lossy, absorptive, and non-square-loop magnetic material.

The core 106 has a first end 112 and a second end 114. A capacitor 116 is connected across the ends 112, 114 and is selected of such value as to coact with the primary 106 and all the reflected impedances appearing thereacross to form a resonant tank. The second end 114 of the primary 106 may be directly connected to the input terminal 112 of the power supply for the circuit of FIG. 5.

A silicon-controlled rectifier 118 is used to gate power from the terminal 100 of the power supply to the first end 112 of the primary 106. The SCR 118 has an input electrode 120, a control electrode 122 and an output electrode 124. The input electrode 120 is connected through a first inductor 128 to the power supply terminal 100, while the output electrode 124 is connected through a second inductor 130 to the end 112. A timing circuit for the SCR 118 includes the series combination of a capacitor 132, a potentiometer 134, and a padding resistor 136 connected between the input electrode 120 of the SCR 118 and the end 112. A semiconductor trigger 138 is then connected from the control electrode of the SCR 118 to a point between the capacitor 132 and the potentiometer 134.

In the operation of the circuit of FIG. 5, the SCR 118 is a semiconductor switching device PNPN variety and thus has an "on" or conductive state and "off" or non-conductive state. Control signals for switching the SCR 118 are created by the charging and discharging of the capacitor 132. The speed of this charge and discharge is determined by the setting of the potentiometer 134. When the capacitor 132 has charged up to a certain level the trigger 138 "fires" to deliver a sharp pulse to the control electrode 122 of the SCR 118, whereupon the SCR 118 is switched from its nonconductive to its conductive state.

Under the influence of the timing signals applied by the trigger 138, the SCR 118 is periodically switched "on," closing the circuit from the input terminal 100 through the inductor 128 and the inductor 130 to the first end 112 of the primary 106. The first effect of this closing is to cause a back EMF in the inductor 128 so that the voltage at the first end 112 of the primary 106 drops in the manner indicated at 90 of FIG. 4. After this voltage is dropped as far as it will go to the point 92 the capacitor 132 is dragged down with it so that the voltage at the input of the trigger 138 goes negative and the trigger no longer supplies a positive signal to the control electrode 122 of the SCR 118. Therefore, at the low point 92 of the waveform of FIG. 4, when the waveform is ready to begin its climb at 94 the SCR 118 is turned off due to the tendency of current to flow backwards therethrough.

Once the SCR 118 is turned off, the primary 106 begins to "collapse" or break down in its initial EMF and permit passage of current therethrough. This phase is represented by the leading edge 94 which climbs from the low point 92 to the high point 98. After the high point 98 is reached, discharge of the capacitor 116 through the primary 106 causes the voltage to pass through the decay portion 96 of the waveform of FIG. 4. It should be noted that the effect on the capacitor 116 not only of the impedance of the primary 106 but also of the instantaneous impedance across the tube 10 and the reflected impedance across the secondary 108 will influence the instantaneous value of the length $l$ and the slope $\alpha$ of the capacitor discharge curve 96.

At the end of the capacitor discharge curve is the next steep negative excursion 90 which takes the voltage level down to the point 92 before another cycle begins. This deep negative excursion has the effect of lowering the reference potential of the luminescent gas molecules 32 in the tube 10, so that charged particles in the mixture become recombined into the molecules. This in turn causes the positive-going portion of the waveform of FIG. 4 to have a maximum excitation effect in producing charged particles in the next cycle of operation.

Referring to FIG. 6, an improved electrode for use in the positions 26, 28 of the luminescent gas tube of FIG. 1 is designed to provide increased electron emission when power is applied. The electrode of FIG. 6 has a ceramic base 150. The ceramic base 150 is coated both at the top and at the bottom with silver layers 152 and 154. The silver layers 152 and 154 are intended to conduct electricity into the electron emission substances of the electrode. The input leads 156 and 158 are connected to the silver layers 152, 154, respectively. Coated on the ceramic base 150 is a layer of the electron-emissive substance 160.

According to the principles of the instant invention, the electron-emissive substance is composed of boron carbide. Applicant has discovered that boron carbide has a very high electron emission rate for a given unit of power, and moreover can be heated to almost infinite temperatures without exhibiting any deterioration or harmful melting. In an actual electrode built according to the principles of the instant invention, the layer 160 of boron carbide was about .0002 inch thick and cooperated with the silver layers 152 and 154 to provide about 500 ohms resistance between the leads 156 and 158.

As another feature of the instant invention there is coated on the boron carbide surface 160 a molecular-thickness amount of gallium. While the boron carbide emits electrons, the gallium is stimulated by the electrons emitted to produce coherent light in the same manner that the luminescent gas produces electromagnetic energy as discussed in connection with FIGS. 2 and 3. The coherent light produced by the gallium has the important property that it propagates in straight line from the face of an electrode such as that shown in FIG. 6, so that the light passes from one end of the tube to the other and returns as if the electrodes at 26 and 28 were two mirrors. The gallium further has the important property that the electromagnetic energy it produces is in the absorption frequency band of the phosphor 52, 54 so that the electron energy immediately converted right at the electrodes 26, 28 into electromagnetic energy is further efficiently used by virtue of the fact that all of the energy conversion results in electromagnetic energy of a frequency usable in the next step of the operation, that is to say, in the phosphor conversion step.

In an actual electrode built in accordance with the principles of the instant invention, the gallium intrusion was about 30 angstroms in thickness. Thereafter such a tube is pumped to a new set of specifications (determined experimentally) different than would normally be used whereby the gases therein will be very near in resonant frequency to the characteristic frequency of the energy emitted by the gallium. For example, in a neon-krypton tube, the neon should be pumped to about ½ mm. Hg, while the krypton should be pumped to about 9 mm. Hg. With other of the gases discussed above, the pumping would be different. However, the broad teaching of the invention is the tailoring of this gas pumping to the characteristics of the gallium emission in such manner that the final efficacy (lumens output/watts input) of the luminescent tube is at a maximum.

It should be noted that gallium has a very low melting temperature—almost room temperature. Thus the high melting temperature of boron has the added advantage of supporting the gallium as temperatures rise during the operation of a gallium-boron carbide electrode. Boron also interacts with gallium to prevent the gallium from acting as a perfect mirror and thus spreading a portion of the light emitted by the gallium.

It should also be noted that the performance of a luminescent gas tube as discussed above can be further improved by the introduction of a slight trace of mercury into the tube. Mercury lighting tubes have been known before, but in these tubes the mercury was the principal factor: it was heated to the point of vaporization by an electron stream conducted through more easily ionizable gases, such as argon or neon, and then mercury carried the sole burden of conversion of electron energy into electromagentic energy. Mercury, of course, has the disadvantage of being useful only at high temperatures, so that the use of mercury as herein disclosed would be good only for the higher temperature tubes.

Thus applicant has achieved a vastly improved luminescent gas tube lighting system by the principles of variation of gas contents and pressure and by the new construction of electrodes as discussed above. Whereas prior art luminescent tubes rarely achieved more than 65 or 70 lumens per watt efficacy, a gas tube according to the instant invention is capable of 324 lumens per watt. It can be seen that such a tube would produce four or five times as much light for the same amount of power applied across its leads, even at 60 cycles per second, but more especially at the higher frequencies as discussed above. While such power savings are of great enough advantage in commercial and domestic lighting installations as are commonly met with, their greatest advantage comes in aircraft and space vehicles where high light output with low power consumption is especially important. For these applications the added characteristic that a luminescent tube as disclosed herein requires no heavy ballasting circuitry or high voltage transformers greatly compounds the benefits provided by the instant invention.

Although this invention has been described in its preferred form with a certain degree of particularity, it should be understood that the present disclosure of the preferred form has been made only by way of example and that numerous changes in the details of construction and in the combination and management of parts may be resorted to without departing from the spirit and scope as hereinafter claimed. For example, the exact combinations of gases in the tube disclosed above may be varied, and likewise the partial pressures of each such component may be adjusted to achieve the greater efficacy taught by the instant invention. Such new combinations would be within the principles disclosed herein. Likewise, improved electrodes could be constructed using analogous substances to perform the functions attributed to boron carbide and gallium in the electrode disclosed in connection with FIG. 6.

I claim as my invention:
1. A lighting tube having:
a hermetically sealed envelope having first and second ends,
a phosphor coating on the inside of said envelope,
a gas mixture in the tube having components pumped to such partial pressures that the resonant frequency of one gas is a harmonic of the resonant frequency of another, and also that these resonant frequencies are such that the mixture can respond to electron collision by ionizing and emitting photons of light in a frequency range whereby said photons will cause the emission of visible light upon reaching said phosphor coating,
a first electrical lead passing through the first end of the hermetically sealed envelope,
a first electrode electrically connected to the first electrical lead, said first electrode being constructed of a substance having a high rate of electron emission under the influence of electrical excitation,
a second electrical lead passing through the second end of the hermetically sealed envelope,
a second electrode electrically connected to the second electrical lead, said second electrode being constructed of a substance having a high rate of electron emission under the influence of electrical excitation, and
a gas permeated into the phosphor coating and having properties of causing said phosphor to continue emitting light after removal of all light-emission stimuli.
2. A lighting tube having no mercury in the tube:
a hermetically sealed envelope having first and second ends,
a phosphor coating on the inside of said envelope,
a gas permeated into the phosphor coating and having properties of causing said phosphor to continue emitting light after removal of all light-emission stimuli,
a first electrical lead passing through the first end of the hermetically sealed envelope,
a first electrode electrically connected to the electrical lead, said electrode being constructed of a substance having a high rate of electron emission under the influence of electrical excitation,
a second electrical lead passing through the second end of the hermetically sealed envelope,
a second electrode electrically connected to the second electrical lead, said second electrode being constructed of a substance having a high rate of electron emission under the influence of electrical excitation, and
a gas mixture in the tube having properties of responding to electron collision by ionizing and emitting photons of light in a frequency range whereby said photons will cause the emission of visible light upon reaching said phosphor coating.
3. The lighting tube of claim 2 wherein the gas permeated in to the phosphor coating is helium.

References Cited
UNITED STATES PATENTS

| | | | |
|---|---|---|---|
| 1,949,069 | 2/1934 | Balcar | 313—226 X |
| 2,182,778 | 12/1939 | Alterthum et al. | 313—226 X |
| 2,525,624 | 10/1950 | Stahl et al. | 315—248 X |
| 2,538,062 | 1/1951 | Touvet | 250—199 |
| 2,622,221 | 12/1952 | Beese | 313—109 |
| 2,790,936 | 4/1957 | Bell | 313—109 X |
| 2,923,856 | 2/1960 | Greene et al. | 315—205 X |
| 3,005,930 | 10/1961 | Mason | 313—109 X |
| 3,294,468 | 12/1966 | Emidy et al. | 316—21 X |

JAMES W. LAWRENCE, Primary Examiner

P. C. DEMEO, Assistant Examiner

U.S. Cl. X.R.

313—226